US011266937B2

(12) United States Patent
Alejandre et al.

(10) Patent No.: US 11,266,937 B2
(45) Date of Patent: Mar. 8, 2022

(54) AIR FLOW RATES IN CYCLONIC PARTICLE SEPARATION CHAMBERS

(71) Applicant: HEWLETT-PACKARD DEVELOPMENT COMPANY, L.P., Houston, TX (US)

(72) Inventors: Ignacio Alejandre, Sant Cugat del Valles (ES); Esteve Comas, Sant Cugat del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 836 days.

(21) Appl. No.: 16/087,702

(22) PCT Filed: Mar. 28, 2017

(86) PCT No.: PCT/US2017/024565
§ 371 (c)(1),
(2) Date: Sep. 24, 2018

(87) PCT Pub. No.: WO2018/182580
PCT Pub. Date: Oct. 4, 2018

(65) Prior Publication Data
US 2020/0368658 A1 Nov. 26, 2020

(51) Int. Cl.
*B01D 50/00* (2006.01)
*B01D 45/12* (2006.01)
(Continued)

(52) U.S. Cl.
CPC ............... *B01D 45/12* (2013.01); *B04C 1/00* (2013.01); *B04C 11/00* (2013.01)

(58) Field of Classification Search
CPC ............ B01D 45/12; B04C 1/00; B04C 11/00
See application file for complete search history.

(56) References Cited

U.S. PATENT DOCUMENTS 1,600,762 A * 9/1926 Hawley ................. B04C 1/00
 95/268
2,616,563 A * 11/1952 Hebb ................... B04C 1/00
 209/722

(Continued)

FOREIGN PATENT DOCUMENTS

CN 104525392 A 4/2015
DE 19847229 A1 5/1999
(Continued)

OTHER PUBLICATIONS

Faulkner et al., "Efficiency and Pressure Drop of Cyclones Across a Range of Inlet Velocities", American Society of Agricultural and Biological Engineers, vol. 22, Issue 1, Retrieved from Internet: http://caaqes.tamu.edu/Publications/Publications/PU00002.pdf, 2006, pp. 155-161.

*Primary Examiner* — Dung H Bui
(74) *Attorney, Agent, or Firm* — HP Inc. Patent Department

(57) ABSTRACT

In an example, an air filtration apparatus includes a cyclonic particle separation chamber having a first inlet to draw air from a first region, second inlet to draw air from a second region, and an exhaust port. The air filtration apparatus may further include a pressure sensor to sense a pressure of the first region, and a cyclonic air flow controller. The cyclonic air flow controller may control an air inflow received via the second inlet in response to an output from the pressure sensor to maintain a total air flow rate via the exhaust port.

15 Claims, 4 Drawing Sheets

(51) Int. Cl.
*B04C 1/00* (2006.01)
*B04C 11/00* (2006.01)

(56) References Cited

U.S. PATENT DOCUMENTS

| | | | | |
|---|---|---|---|---|
| 6,004,385 | A * | 12/1999 | Birmingham | B01D 19/0057 96/174 |
| 6,599,348 | B2 * | 7/2003 | Chosnek | B01D 45/12 95/271 |
| 6,739,456 | B2 | 5/2004 | Svoronos et al. | |
| 6,790,346 | B2 | 9/2004 | Caleffi | |
| 7,311,746 | B2 * | 12/2007 | Stell | B01D 19/0036 55/419 |
| 8,813,967 | B2 | 8/2014 | Plant et al. | |
| 10,610,873 | B2 * | 4/2020 | Lalli | B01D 37/043 |
| 2004/0004028 | A1 * | 1/2004 | Stell | C10G 9/00 208/130 |
| 2005/0242007 | A1 * | 11/2005 | Simpson | B04C 5/13 209/716 |
| 2007/0214756 | A1 * | 9/2007 | Lee | B04C 5/04 55/419 |
| 2010/0258512 | A1 * | 10/2010 | Larson | B04C 5/04 210/788 |
| 2015/0041374 | A1 * | 2/2015 | Kramer | C01F 11/468 209/729 |
| 2015/0290560 | A1 * | 10/2015 | Hoydal | B01D 19/0063 95/22 |
| 2015/0298397 | A1 | 10/2015 | Chen et al. | |
| 2016/0059310 | A1 | 3/2016 | Junker et al. | |
| 2016/0107120 | A1 * | 4/2016 | Hallowell | B01D 53/8696 422/109 |
| 2016/0193696 | A1 | 7/2016 | McFarland et al. | |
| 2016/0271545 | A1 * | 9/2016 | Spierdijk | B01D 45/16 |
| 2016/0271885 | A1 | 9/2016 | Shi et al. | |
| 2017/0056799 | A1 * | 3/2017 | Palmas | B04C 5/103 |
| 2020/0330914 | A1 * | 10/2020 | Culubret | B04C 9/00 |

FOREIGN PATENT DOCUMENTS

RU 19642 U1 9/2001
SU 532400 A1 10/1976

* cited by examiner

AIR FLOW RATES IN CYCLONIC PARTICLE SEPARATION CHAMBERS

BACKGROUND

Cyclonic particle separation apparatus may be used to separate particles from an air flow. For example, Industrial and domestic vacuum cleaners and filters may make use of cyclonic particle separation apparatus.

In examples of such apparatus, air may be drawn into a cylindrical or conical chamber and caused to flow in a spiral. Particles suspended in the air, being heavier, move towards the edge of the chamber. The particles then tend to strike the chamber walls, fall and collect at the bottom of the chamber.

BRIEF DESCRIPTION OF DRAWINGS

Non-limiting examples will now be described with reference to the accompanying drawings, in which.

DETAILED DESCRIPTION

Figure 1:
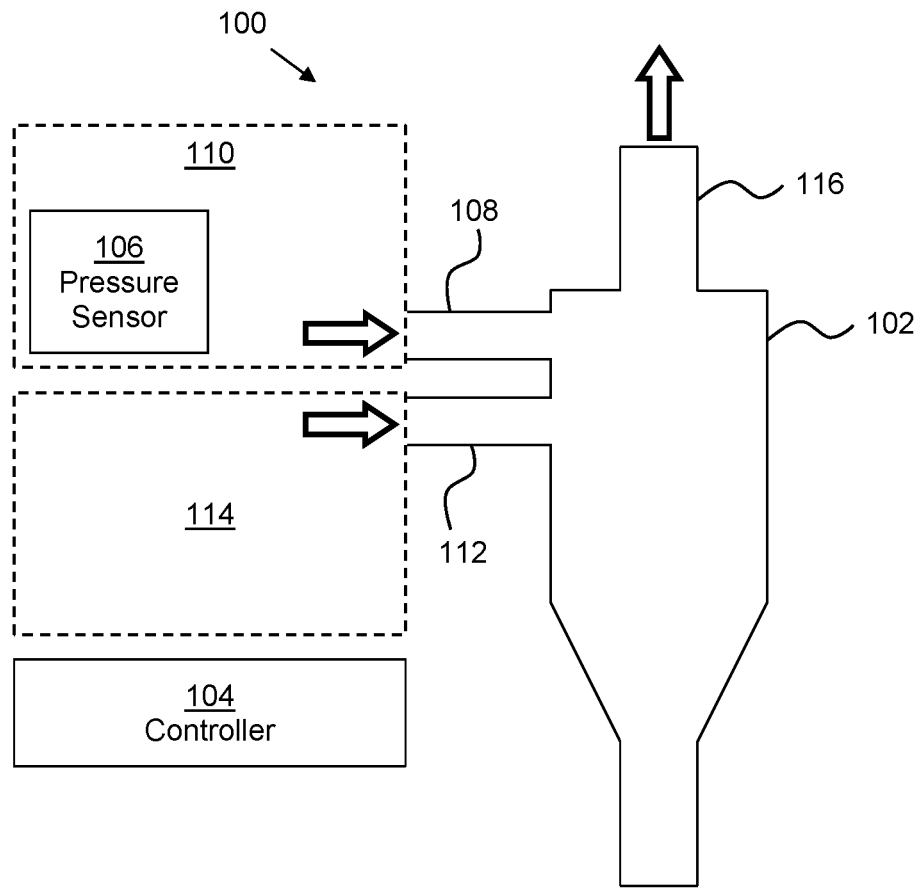
FIGS. 1 and 2 are examples of air filtration apparatus.

Filtering apparatus may be used with additive manufacturing apparatus or in other applications to separate particles from fluid flows.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. In some examples, a carriage may move across a print bed to provide and/or level a layer of build material.

In some examples, selective solidification is achieved through directional application of energy, for example using a laser or electron beam which results in solidification of build material where the directional energy is applied. In some examples, the build material may be a resin, which is cured or solidified with light or another energy source.

In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. A coalescence modifying agent (also referred to as modifying or detailing agents), which acts to modify the effects of a fusing agent for example by reducing or increasing coalescence or to assist in producing a particular finish or appearance to an object, and such agents may also be used as a print agent in some examples. A coloring agent, for example comprising a dye or colorant, may in some examples be used as a fusing agent or a modifying agent, and/or as a print agent to provide a particular color for the object. Build material, print agents and/or energy to cause coalescence may be distributed or provided from components which move within the fabrication chamber.

Where powder-like materials are used in object manufacture, some of the powder may become dispersed, for example within the air inside the fabrication chamber. In some such examples, a vacuum system may be used to extract air from the chamber (for example, to provide cooling within the fabrication chamber), and the vacuum system may be provided with a particle separation apparatus. This particle separation apparatus may be used to remove particles of build material which could otherwise be expelled outside the machine, creating a particle filled atmosphere which may for example be inhaled by machine operators. In some examples, such apparatus may comprise micro filters, cartridge filters, or the like.

In examples set out herein, cyclonic separation apparatus is used to separate build material from air extracted from a fabrication chamber. Cyclonic separation apparatus is resistant to clogging but the apparatus is generally optimised for particular particle sizes and flow rates.

FIG. 1 shows an example of an air filtration apparatus 100 comprising a cyclonic particle separation chamber 102, a cyclonic air flow controller 104 and a pressure sensor 106. The cyclonic particle separation chamber 102 has a first inlet 108 to draw air from a first region 110, a second inlet 112 to draw air from a second region 114 and an exhaust port 116. The pressure sensor 106 is to sense a pressure of the first region 110. The cyclonic air flow controller 104 is to control an air inflow received via the second inlet 112 in response to an output from the pressure sensor 106 to maintain a total air flow rate (i.e. for example, to achieve a predetermined total air flow) via the exhaust port 116. In some examples, the pressure sensor 106 may be placed at a location which is relatively distant from air ingress and/or egress points of the first region 110 so as to obtain a representative pressure of the first region.

This may allow a total flow rate (i.e. a total of the air flow rates through the first and second inlets) to be substantially constant while the first inflow changes due to changes in pressure in the first region from which air is extracted. In some examples, the air inflow received via the second inlet 112 may be zero in some states of operation. In some examples, the air filtration apparatus 100 may be a filtration apparatus for an additive manufacturing apparatus, and the pressure sensor 106 may be to be placed in a fabrication chamber (i.e. the first region 110 may be, in use of the air filtration apparatus 100, a fabrication chamber of an additive manufacturing apparatus). Air may be drawn from the fabrication chamber to provide a cooling effect on an object under generation. However, the air pressure in the chamber may change for example based on the location of items or apparatus components in the chamber. For example, a component such as a print head, build material spreading apparatus, energy source or the like may move through the chamber and may, based on its position, cause a disruption of the air flow into the fabrication chamber. For example a component may partially bloc, or otherwise impede, air flow into the chamber via at least one air ingress point while air is being drawn from the chamber. Therefore, in some examples, the pressure sensor 106 may sense a change in pressure associated with a change in air inflow to the chamber 102 caused by the location of a moveable component within the first region 110. This could result in a reduction in the chamber pressure, which in turn leads to a reduction of air flow through the first inlet 108 and thereby a reduction of the total air flow via the exhaust port 116. This in turn could lead to a reduction in separation efficiency in the cyclone, and inefficiently filtered (or 'dirty') air being exhausted and either potentially clogging subsequent filters or entering the air. However, if the reduction in air flow through the first inlet is compensated for by increasing an air flow from another region (i.e. the second region 114), for example outside the fabrication chamber, the efficiency of particle separation may be maintained.

In the case of additive manufacturing, the size of particles may be relatively well defined and/or known. For example, a density, average particle size and/or range of particle size for a particular build material to be used in a particular apparatus or build operation may be known. Thus it is may be possible for a total air flow to be selected which is suited to a particular cyclone design and/or that particle size, resulting in turn in an effective particle separation system.

Although the inlets 108, 112 are shown as separately connected to the chamber 102, in other examples, the airflows there through may merge before entering the chamber 102. In use of the air filtration apparatus 100, particles may be separated from a helical air flow in the cyclonic particle separation chamber 102 and fall to the bottom of the cyclonic particle separation chamber 102.

Figure 2:
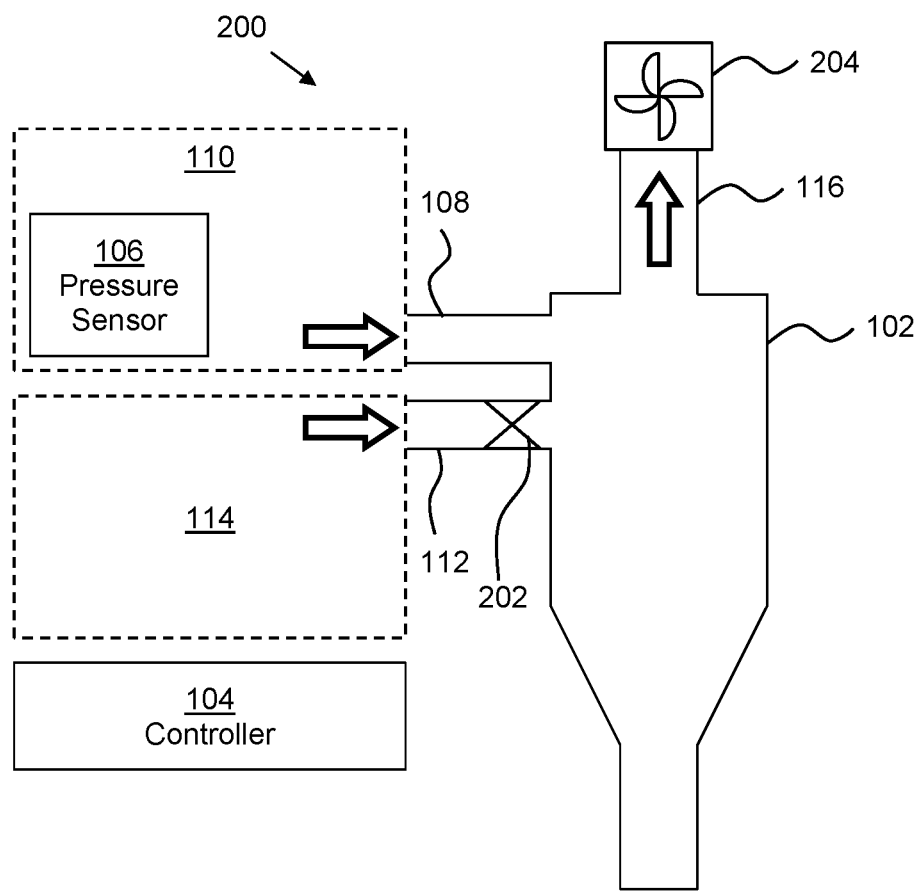

FIG. 2 shows another example of an air filtration apparatus 200, in which parts in common with FIG. 1 are labelled with like numbers. In this example, the second inlet 112 comprises an inlet air flow regulator 202 in the form of a valve having a variable aperture size (which may include a closed, or zero, aperture size). The exhaust port 116 comprises an exhaust air flow regulator 204, in this example in the form of a fan. The cyclonic air flow controller 104 controls the inlet and exhaust air flow regulators 202, 204.

In use of the apparatus 200, the air exhaust port 116 is intended to expel air at a total flow rate, wherein the cyclonic air flow controller 104 controls air inflow through the second inlet 112 via the inlet air flow regulator 202 such that the total flow rate is within a predetermined value range. For example, the value range may be selected for separating particles corresponding to the size or weight of build material particle to be separated from an air flow. The value range may for example be selected according to a build material in use in an additive manufacturing apparatus associated with the air filtration apparatus 200, which may be capable of generating objects using a plurality of different build materials, wherein the build materials may be distinguished from one another at least in part based on the particle size, size distribution and/or material density.

In some examples, the cyclonic air flow controller 104 controls the second air inflow via the inlet air flow regulator 202 by changing the aperture size such that the total flow rate through the exhaust air flow regulator 204 is substantially constant, or meets at least one predetermined parameter. The rate may be selected based on the level of cooling required, which may in turn be affected by the volume of material being solidified (with larger volumes generating greater heat), ambient temperature, atmospheric pressure (with lower pressures generally suggesting higher flow rates for a given cooling effect) and/or based on the size or weight of build material particle to be separated from an air flow.

Figure 3:
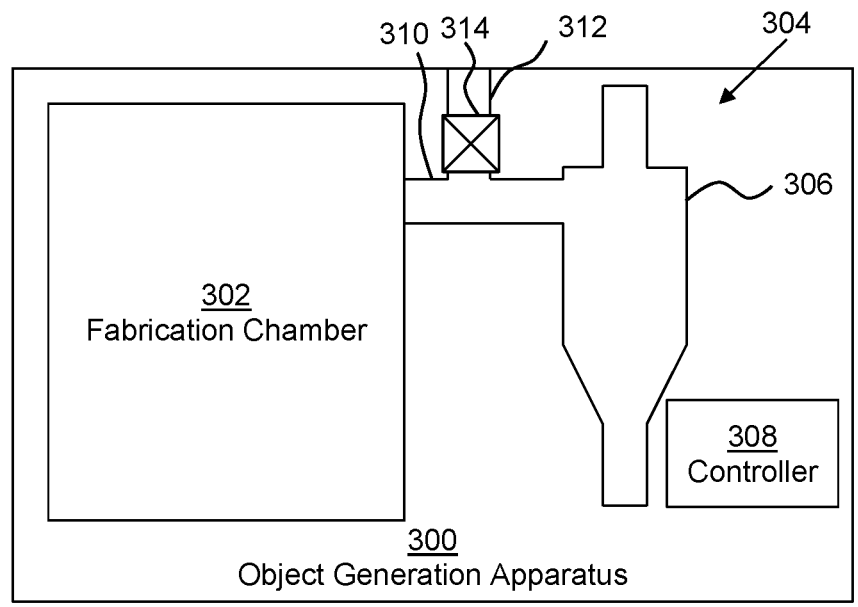
FIGS. 3 and 4 are examples of additive manufacturing apparatus.

FIG. 3 shows an example of an object generation apparatus 300 comprising a fabrication chamber 302 and a cyclonic separation apparatus 304. The cyclonic separation apparatus 304 comprises a cyclonic separation chamber 306 and a cyclonic air flow controller 308. The cyclonic separation chamber 306 is to filter air extracted from the fabrication chamber 302 and comprises a first air inlet 310 to receive a first air inflow from the fabrication chamber 306 and a second air inlet 312 to receive a second air inflow from outside the fabrication chamber, the first and second air inflows together providing a cyclone air flow. The second air inlet 312 comprises an air inflow regulator, in this example a valve 314 comprising an aperture of controllable size. In this example, the first 310 and second 312 air inlets merge prior to entering the cyclone portion of the chamber 302 but this need not be the case in all examples. The cyclonic air flow controller 308 controls the air inflow regulator valve 314 to change the second air inflow to compensate for changes in the first air inflow such that the cyclone air flow conforms to predetermined parameters. For example, this may comprise increasing the size of an aperture in the valve 314 to increase the second air inflow when the first air inflow has decreased, or vice versa.

In some examples the cyclonic air flow controller 308 may comprise a component of an apparatus controller, which may control other aspects of operation of the apparatus 300.

Figure 4:
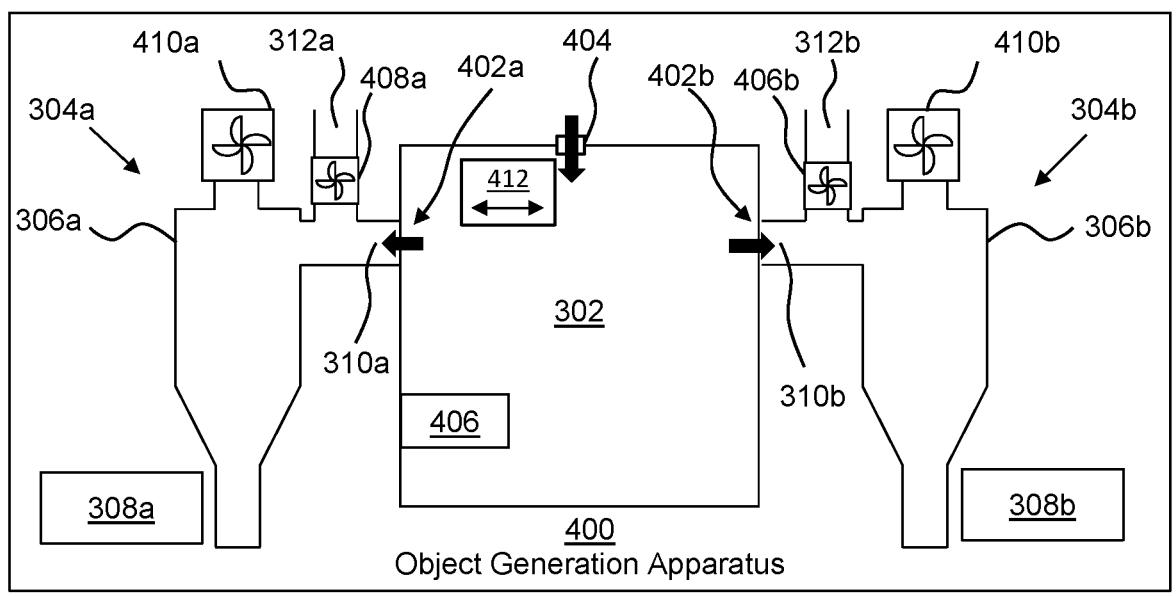

FIG. 4 shows another example of an object generation apparatus 400, in which parts in common with FIG. 3 are labelled with like numbers. In this example, the object generation apparatus 400 comprises a first and a second cyclonic separation apparatus 304*a*, *b*, each comprising a respective air flow controller 308*a*, 308*b*, although in other examples, one air flow controller 308 may control the air flow regulators of different cyclonic separation apparatus 304*a*, *b*.

The fabrication chamber 302 in this example comprises a first and second air outlet 402*a*, 402*b*, which are connected to respective first air inlets 310*a*, 310*b* and also comprises an air ingress port 404. In other examples there may be a plurality of air ingress ports, which may be similar or may differ in form. In this example, the air ingress port 404 is effectively an opening in the chamber 302 through which air can enter (and which may be provided with a filter or the like so as to prevent dust filled air within the chamber 302 from re-entering the atmosphere, and/or to control contamination of the content of the chamber 302).

Within the fabrication chamber 302 there is a pressure sensor 406, which is positioned so as to be relatively distant from the outlets 402*a*, 402*b* and the air ingress port 404. In some examples, this may be mounted on a side wall of the fabrication chamber 302 or the like. In some examples, a plurality of pressure sensors 406 may be provided and a cumulative or average reading may be determined therefrom to determine the pressure within the chamber 302.

The respective second air inlets 312*a*, 312*b* comprise air inflow control mechanisms, in this example in the form of fans 408*a*, 408*b*, and the respective cyclonic air flow controllers 308*a*, 308*b* control the second inflow of the associated cyclonic separation chamber 306*a*, 306*b* in response to an output of the pressure sensor 406.

The apparatus 400 further comprises a first and second exhaust fan 410*a*, 410*b* to draw air through the cyclonic separation chambers 306*a*, 306*b*. In some examples, the exhaust fans 410*a*, 410*b* may be disposed within exhaust ports. The cyclonic air flow controllers 308*a*, 308*b* control the exhaust fans 410*a*, 410*b* such that the intended air flow therethrough is within predetermined parameters. For example an intended flow rate may be selected to be around 12-20 m/s, and in some examples the selection may be based on the particle size, density, an atmospheric temperature, an atmospheric pressure, a volume of an object or objects being generated (which relates to the heat produced) and the like. The apparatus may be controlled so as to maintain this flow rate to substantially within 1 m/s of the selected value, or within 0.5 m/s, 0.2 m/s or the like. In some example, the intended total air flow may vary during an object generation operation.

In this example, the object generation apparatus 400 further comprises a moveable component 412 which in use of the apparatus 400 changes its position within the fabrication chamber 302. For example, such a moveable component 412 may comprise a print head, a heat lamp, a build material spreader carriage or the like. In some examples, an object generation apparatus 400 may comprise a plurality of moveable components 412, which may comprise different component types and/or a plurality of a particular component type. The moveable component 412 may have a position with is variable with respect to the air ingress port 404. As such, as the moveable component 412 moves through the fabrication chamber 302, it may cause a change in the air inflow through the air ingress port 404, for example assuming a position in which it partially blocks the air ingress port 404, or impedes the flow of air therethrough. In such an example, the operation of the exhaust fans 410a, 410b may continue unchanged, which may result in a drop in pressure in the chamber 302 as air in the chamber 302 may not be replaced at the same rate at which it is extracted. When the drop in pressure is detected by the pressure sensor 406, the cyclonic air flow controllers 308a, 308b operate to start up, or increase the speed of, the fans 408a, 408b, drawing air into the cyclonic separation chambers 306a, 306b from outside the fabrication chamber 302, and thus compensating for the reduction in air flow from the chamber 302 associated with the drop in pressure, maintaining a total air flow through the cyclonic separation chambers 306a, 306b, and therefore maintaining the efficiency of particle separation.

Such an impedance of the air inflow caused by the location of the moveable component 412 may be temporary: the moveable component 412 may relocate to a different location. This may result in the pressure in the chamber 302 being restored, and the cyclonic air flow controllers 308a, 308b may then operate to stop, or to slow down the speed of, the fans 408a, 408b. In examples where the cyclonic air flow controllers 308a, 308b comprise valves having a variable aperture size, the cyclonic air flow controllers 308a, 308b may control the size of an aperture to increase or decrease the flow therethrough (which is drawn by the operation of the exhaust fans 410a, 410b). In other examples, such a decrease in flow via the second inlets 312a, 312b may be triggered in some other way, for example following a predetermined delay from the decrease in pressure being recorded.

This may be summarised as $$Q_{total} = Q_{clean} + Q_{dirty}$$

Where Q is a flow rate, $Q_{total}$ is the flow rate through each of the exhaust fans 410, $Q_{clean}$ is the flow rate through a second inlet 312 and $Q_{dirty}$ is a flow rate through a first inlet 310.

In order to maintain $Q_{total}$ if $Q_{dirty}$ changes (as may be inferred through a measurement of pressure in the chamber 302), $Q_{clean}$ may be altered to compensate.

In the example of FIG. 4, the moveable component 412 moves in a horizontal plane but in other examples, a moveable component 412 may move in a vertical and/or horizontal plane.

The object generation apparatus 300, 400 may comprise additional components. For example, a print bed may be provided within the apparatus, which in some examples may be lowered as an object is generated such that the layer of an object which is being formed is at a substantially constant height. The object generation apparatus 300, 400 may comprise any of the components or features described in relation to FIGS. 1 and 2. In some example, the air filtration apparatus 100, 200 of FIGS. 1 and/or 2 may provide the cyclonic separation apparatus 304 or FIGS. 3 and/or 4.

Figure 5:
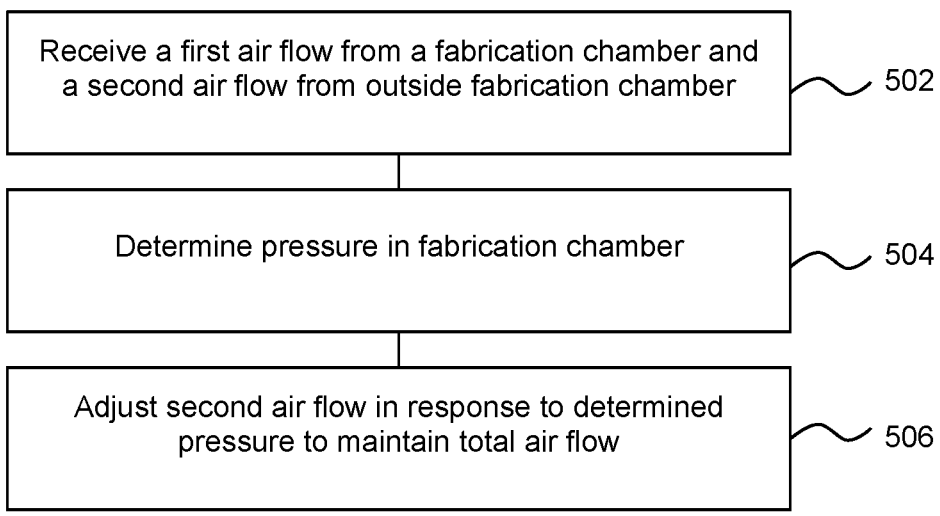
FIG. 5 is a flowchart of an example method for filtering air extracted from a fabrication chamber of an additive manufacturing apparatus.

FIG. 5 comprises an example of a method, which may be a method of cooling an object being generated in an object generation apparatus, and/or of filtering air extracted from a fabrication chamber of an additive manufacturing apparatus. Block 502 comprises providing, into a cyclonic separation chamber, a first air flow from a fabrication chamber of an object generation apparatus and a second air flow from outside the fabrication chamber. The first and second air flow may combine to provide a total air flow. Block 504 comprises determining a pressure in the fabrication chamber. In some examples, the pressure may be indicative of an impedance of air ingress into the fabrication chamber and/or indicative that air is being extracted from the chamber at a greater rate than air is entering the chamber, and/or an indication that an impedance of air ingress has been removed or reduced. In some examples, this may be due to the position of a moveable component within the apparatus. Block 506 comprises adjusting the second air flow in response to the determined pressure to maintain a total air flow through the cyclonic separation chamber.

For example, this may be adjusted such that the total air flow is within predetermined parameters. In some examples, block 506 comprises adjusting the second air flow by controlling a speed of a fan. Block 506 may comprise adjusting the second air flow such that the total air flow is substantially constant for at least a period of operation. In some example an intended total air flow may be set at different levels during an object manufacturing process.

In some examples, the method may be carried out using any of the apparatus described above.

Some examples in the present disclosure may utilise machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. It shall be understood that at least some flows and blocks, as well as combinations thereof, can be realized, at least in part, by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (for example, the air flow controllers 104, 308) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. Air filtration apparatus comprising:
   a cyclonic particle separation chamber having a first inlet to draw air from a first region, second inlet to draw air from a second region, and an exhaust port;
   a pressure sensor to sense a pressure of the first region; and
   a cyclonic air flow controller to control an air inflow received via the second inlet in response to an output from the pressure sensor to maintain a total air flow rate via the exhaust port.

2. Air filtration apparatus according to claim 1 in which the second inlet comprises an inlet air flow regulator and the exhaust port comprises an exhaust air flow regulator and cyclonic air flow controller is to control the inlet air flow regulator.

3. Air filtration apparatus according to claim 2 in which at least one of the inlet air flow regulator and the exhaust air flow regulator is a fan.

4. Air filtration apparatus according to claim 2 in which the inlet air flow regulator is a valve.

5. Air filtration apparatus according to claim 1 in which the cyclonic air flow controller is to control the air inflow received via the second inlet such that the total air flow rate is within a predetermined value range.

6. Air filtration apparatus according to claim 1 in which the cyclonic air flow controller is to control the air inflow received via the second inlet such that the total air flow rate is substantially constant.

7. An object generation apparatus comprising:
   a fabrication chamber;
   a cyclonic separation apparatus; and
   a cyclonic air flow controller;
   wherein:
   the cyclonic separation apparatus comprises a cyclonic separation chamber to filter air extracted from the fabrication chamber, a first air inlet to receive a first air inflow from the fabrication chamber and a second air inlet to receive a second air inflow from outside the fabrication chamber, the first and second air inflows providing a cyclone air flow and the second air inlet comprising an air inflow regulator; and
   the cyclonic air flow controller is to control the second air inflow to compensate for changes in the first air inflow such that the cyclone air flow conforms to predetermined parameters.

8. An object generation apparatus according to claim 7 which comprises a plurality of cyclonic separation chambers.

9. An object generation apparatus according to claim 7 further comprising a pressure sensor disposed within the fabrication chamber.

10. An object generation apparatus according to claim 9 in which the fabrication chamber comprises an air outlet which is connected to the first air inlet of the cyclonic separation apparatus, wherein the pressure sensor is located away from the air outlet.

11. An object generation apparatus according to claim 7 in which the fabrication chamber comprises an air ingress port and the object generation apparatus further comprises a moveable component which, in use of the object generation apparatus, has a variable position within the fabrication chamber with respect to the air ingress port.

12. An object generation apparatus according to claim 7 further comprising an exhaust fan to draw air through the cyclonic separation chamber, wherein the cyclonic air flow controller is to control the exhaust fan.

13. A method comprising:
   receiving, into a cyclonic separation chamber, a first air flow from a fabrication chamber of an object generation apparatus and a second air flow from outside the fabrication chamber;
   determining a pressure in the fabrication chamber; and
   adjusting the second air flow in response to the determined pressure to maintain a total air flow through the cyclonic separation chamber.

14. A method according to claim 13 comprising adjusting the second air flow by controlling a speed of a fan.

15. A method according to claim 13 comprising adjusting the second air flow such that the total air flow is substantially constant.

* * * * *